(12) United States Patent
Fujimoto

(10) Patent No.: US 7,682,537 B2
(45) Date of Patent: Mar. 23, 2010

(54) MOLD-PRESS FORMING APPARATUS AND METHOD OF MANUFACTURING A FORMED PRODUCT

(75) Inventor: Tadayuki Fujimoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 911 days.

(21) Appl. No.: 11/230,887

(22) Filed: Sep. 21, 2005

(65) Prior Publication Data
US 2006/0059949 A1 Mar. 23, 2006

(30) Foreign Application Priority Data
Sep. 21, 2004 (JP) .............................. 2004-273850

(51) Int. Cl.
B29C 43/56 (2006.01)
(52) U.S. Cl. ................. 264/101; 264/1.1; 264/1.21; 264/40.3; 264/85; 264/322; 264/325; 425/808; 65/29.15; 65/32.1; 65/32.5; 65/379; 65/157; 65/489
(58) Field of Classification Search .......... 264/101, 264/1.1, 40.3, 85, 1.21, 322, 325; 65/29.15, 65/32.1, 32.5, 157, 379, 489; 425/808
See application file for complete search history.

(56) References Cited

U.S. PATENT DOCUMENTS

| 1,374,493 | A | * | 4/1921 | Dimitri et al. ................ 501/94 |
| 2,319,014 | A | * | 5/1943 | Smith .......................... 264/2.4 |
| 4,138,086 | A | * | 2/1979 | Mizutani et al. ............. 425/808 |
| 4,778,505 | A | * | 10/1988 | Hirota et al. .................. 65/102 |
| 4,836,838 | A | | 6/1989 | Hirota et al. |
| 5,904,746 | A | * | 5/1999 | Okada ......................... 425/808 |
| 6,560,994 | B1 | * | 5/2003 | Hirota ............................ 65/24 |
| 2003/0182964 | A1 | * | 10/2003 | Fukuyama et al. ......... 65/29.11 |
| 2004/0000170 | A1 | * | 1/2004 | Matsumura et al. .......... 65/157 |

FOREIGN PATENT DOCUMENTS

| JP | 7-29779 B2 | 4/1995 |
| TW | 593174 B | 6/2004 |

OTHER PUBLICATIONS

Chinese Office Action corresponding to Chinese Patent Application No. 200510106301.3 dated Oct. 16, 2009.

* cited by examiner

*Primary Examiner*—Joseph S Del Sole
*Assistant Examiner*—Timothy Kennedy
(74) *Attorney, Agent, or Firm*—Sughrue Mion, PLLC

(57) ABSTRACT

A mold-press forming apparatus for applying a molding pressure to a mold containing a forming material to perform press forming includes a loading chamber (that is, an airtight chamber) P1 kept airtight. The loading chamber P1 is connected to a pressure reducing member which includes evacuating members 14 and 13 arranged in an evacuating path 7 connected to the loading chamber P1 for evacuating a gas in the loading chamber P1, and a plurality of valves 11 and 12 arranged in the evacuating path 7 in parallel to each other. When the loading chamber P1 is evacuated, the pressure reducing member changes a pressure reducing rate in the course of pressure reduction.

4 Claims, 6 Drawing Sheets

MOLD-PRESS FORMING APPARATUS AND METHOD OF MANUFACTURING A FORMED PRODUCT

This application claims priority to prior Japanese patent application JP 2004-273850, the disclosure of which is incorporated herein by reference.

BACKGROUND OF THE INVENTION

This invention relates to a mold-press forming apparatus and a formed product manufacturing method for producing a formed product (for example, an optical element such as a high-precision glass lens) by press forming using a mold comprising an upper mold, a lower mold, and a body mold (ex. sleeve) subjected to precision-working in conformity with a desired optical element shape and, in particular, to a mold-press forming apparatus and a formed product manufacturing method capable of mass-producing an optical element high in profile accuracy and surface accuracy with high productivity.

Development has been made of a wide variety of methods for producing an optical element, such as a high-precision glass lens, by press forming using a precision-worked mold without allowing a softened glass to be adhered to the mold (for example, see Japanese Examined Patent Application Publication (JP-B) No. H7-29779 corresponding to U.S. Pat. No. 4,836,838).

The above-mentioned publication discloses an apparatus having a structure in which a formed glass product is produced from a forming material (glass preform) by successively transferring a mold containing the forming material through a plurality of processing chambers including a heating chamber, a pressing chamber, and a cooling chamber sequentially arranged adjacent to each other. By the apparatus having the above-mentioned structure, it is possible to maintain thermal uniformity of the mold and to continuously produce formed products at a high processing speed.

Generally, pressing by a mold-press forming apparatus is carried out at a high temperature. In particular, in case where the forming material is a glass material, a press temperature is as high as 500-800° C. At such a high temperature, pressing must be performed in a nonoxidizing atmosphere in order to protect a mold material (ceramics, cemented carbide, or the like) and a releasing film (containing carbon or precious metal as a main component) formed on a forming surface of the mold.

Accordingly, each processing chamber heated to a high temperature, such as a pressing chamber in which press forming is performed, is evacuated to vacuum by evacuating air or is maintained as filled with a nonoxidizing gas atmosphere such as nitrogen or argon. In order to maintain the atmosphere in each processing chamber, loading and unloading of the mold must be carried out in a state where a gas flow to and from the outside is inhibited.

Referring to FIGS. 1 and 2, description will be made of the structure of the apparatus disclosed in the above-mentioned publication.

The apparatus comprises a loading/unloading chamber P1 disposed above a forming chamber 1, and a plurality of processing chambers (a first heating chamber P2, a second heating chamber P3, a soaking chamber P4, a pressing chamber P5, a first slow cooling chamber P6, a second slow cooling chamber P7, and a rapid cooling chamber P8) which are arranged inside the forming chamber 1 sequentially in a circumferential direction. The inside of the forming chamber 1, i.e., the processing chambers P2 to P8 are continuously under a nonoxidizing gas atmosphere. A mold 4 containing a forming material (later illustrated), which is, for example, glass to be formed, is placed on a support 3 of a rotary table 2 and is successively transferred through the processing chambers P2 to P8. As illustrated in FIG. 1, the processing chambers P2 to P8 are partitioned from one another by a plurality of shutters S1 to S6 (no shutter is formed between the soaking chamber P4 and the pressing chamber P5).

The rotary table 2 has a rotation shaft and an index machine disposed at its center although not shown in the figure. The support 3 has a base 3a provided with a bottom protrusion engaged with a mounting hole 2a formed at an outer peripheral portion of the rotary table 2. The mold 4 containing the glass to be formed is placed on the support 3. The support 3 is disposed so that the mold 4 passes through a substantial center of each of the processing chambers P2 to P8 within the forming chamber 1.

As shown in FIG. 2, a cylinder 5 is disposed below the support 3 in order to move the support 3 upward and downward.

The rotary table 2 is provided with a plurality of mounting holes 2a arranged along a circumferential direction. Each mounting hole 2a is engaged with each of a plurality of supports 3. Thus, a plurality of molds 4 are present in the forming chamber 1 and formed products are continuously formed.

Above the forming chamber 1 and along an axis of a piston rod 5a of the cylinder 5, a seal mount 6 and a bell jar 8 are fixed. The forming chamber 1 is provided with an opening 1a formed on a portion to which the seal mount 6 is fixed. The opening 1a communicates with the seal mount 6. Through the opening 1a, the support 3 moves from the forming chamber 1 into the seal mount 6 and moves out of the seal mount 6 to the forming chamber 1. The seal mount 6 is provided with an evacuating path 7 connected to an evacuating member (will later be described).

The bell jar 8 positioned above the seal mount 6 is driven by a cylinder 9 to be connected to and disconnected from the seal mount 6.

The base 3a of the support 3 is provided with an O ring 3b arranged at a portion covering the opening 1a. The seal mount 6 is provided with an O-ring 6b arranged at a portion kept in contact with an upper surface of the forming chamber 1 and an O-ring 6c arranged at a portion to be brought into contact with the bell jar 8.

A combination of the seal mount 6, the bell jar 8, and the O-rings 3b, 6b, and 6c forms the loading/unloading chamber (airtight chamber) P1.

Next, description will be made of gas exchange at the loading/unloading chamber P1 in the apparatus disclosed in the above-mentioned publication.

The mold 4 is placed on the support 3 and transferred by rotation of the rotary table 2 through the processing chambers P2 to P8. After completion of forming, the mold 4 returns to a position corresponding to the loading/unloading chamber P1. Then, the piston rod 5a is elevated. Following the elevation of the piston rod 5a, the support 3 is elevated also to move the mold 4 through the opening 1a to the seal mount 6.

Consequently, the O-ring 3b arranged at the base (or a flange portion) 3a of the support 3 is pressed against a peripheral edge of the opening 1a to isolate the inside of the forming chamber 1 and the loading/unloading chamber P1 from each other (see two-dot-and-dash lines in FIG. 2). In this state, the bell jar 8 is elevated by the piston rod 9a and the mold 4 containing a formed product is taken out by a robot or the like (not shown). The mold 4 thus taken out is transferred to a step of disassembling the mold 4 by a disassembling device (not shown) to take out the formed product in the mold 4.

After the mold 4 containing the formed product is taken out, a next mold 4 containing a new forming material is placed on the support 3 by a robot or the like (not shown). Next, the bell jar 8 is moved downward until a flange portion 8a of the bell jar 8 is brought into contact with the O-ring 6c of the seal mount 6 to thereby form the loading/unloading chamber P1. The loading/unloading chamber P1 is evacuated first and then filled with a nonoxidizing gas. As the nonoxidizing gas, an atmosphere same as the forming chamber may be used by making the loading/unloading chamber P1 communicate with the inside of the forming chamber.

Then, when the mold 4 is placed on the support 3, the piston rod 5a is moved downward to lower the support 3 and to return the support 3 onto the rotary table 2. In this state, the seal mount 6 and the bell jar 8 are kept in contact with each other. Therefore, even if the opening 1a is opened, the gas within the forming chamber 1 does not leak out.

By the mold-press forming apparatus mentioned above, the formed product is formed in the following manner.

The support 3 with the mold 4 placed thereon is put on the rotary table 2. The mold 4 is transferred by rotation of the rotary table 2 successively through the processing chambers P2 to P8. The mold 4 is at first heated in the heating chambers (the first heating chamber P2, the second heating chamber P3 and/or the soaking chamber P4) to a temperature appropriate for press forming so that the forming material contained therein is softened. With reference to necessary temperature elevation and soaking, a plurality of the heating chambers are used and appropriate temperatures are respectively set. The mold 4 heated to an appropriate temperature is transferred to the pressing chamber P5 having a press shaft.

In the pressing chamber P5, the mold 4 is applied with a predetermined load. Profiles of forming surfaces of the upper and the lower molds precision-worked are transferred and reproduced on the forming material to thereby form the formed product. The formed product is kept contained in the mold 4 and transferred to the cooling chambers (the first slow cooling chamber P6, the second slow cooling chamber P7, and/or the rapid cooling chamber P8) to be cooled to a temperature near a transition point at an appropriate cooling rate.

Thereafter, the mold 4 (containing the formed product) sufficiently cooled is transferred from the cooling chambers to a position corresponding to the loading/unloading chamber P1 and moved to the loading/unloading chamber P1 as described above.

When the mold 4 is moved to the processing chambers P2 to P8, the shutters S1 to S6 between adjacent ones of the processing chambers are opened and closed.

Thus, the mold is successively transferred and press forming is carried out. Simultaneously, at the loading/unloading chamber P1, the mold containing the formed product is taken out and another mold containing a new forming material is introduced. Thus, continuous forming is carried out.

However, the formed product obtained by the continuous forming as described above may suffer occurrence of a defective shape such as uneven thickness. The present inventor found out that the forming material contained in the mold is displaced prior to press forming and a defect such as uneven thickness is caused due to displacement of the forming material.

Specifically, uneven thickness does not occur if press forming is performed in a state where the forming material X is set at the center of the mold, as illustrated in FIG. 3A. On the other hand, if the forming material X contained in the mold is displaced as illustrated in FIG. 3B prior to the press forming, the formed product having uneven thickness is produced during the press forming. This results in a defective shape and insufficiency of an effective optical diameter of an optical element as the formed product.

When the forming material X is contained in the mold, the forming material X is kept in contact with forming surfaces of the upper and the lower molds and lightly clamped therebetween. Therefore, once the forming material X is displaced and decentered, the forming material X hardly returns to an initial position (center position).

In view of the above, position control upon positioning the forming material in the mold is sufficiently carried out so as to position the forming material at the center of the mold. However, even if the forming material is placed at the center of the mold, the above-mentioned uneven thickness is caused to occur.

Under the circumstances, the present inventor investigated the cause of the above-mentioned displacement and analyzed the behavior of the mold in the loading/unloading chamber P1 upon gas exchange at the loading/unloading chamber P1. As a result, it has been found out that the forming material in the mold is moved due to rapid evacuation from the loading/unloading chamber or that the mold itself vibrates to cause displacement of the forming material contained therein. Further, it has been found out that the mold is inclined on the support due to evacuation to cause displacement of the forming material.

In particular, the above-mentioned displacement is remarkable in case where the forming material has a spherical shape or a radius of curvature of a concave forming surface of the lower mold is relatively large.

SUMMARY OF THE INVENTION

It is therefore an object of this invention to provide a mold-press forming apparatus and a formed product manufacturing method capable of producing a formed product without uneven thickness by preventing displacement of a forming material during pressure reduction of an airtight chamber.

According to this invention, there is provided a mold-press forming apparatus for carrying out press forming by applying a molding pressure to a mold which contains a forming material, which apparatus comprises:

at least one airtight chamber for placing the mold therein, and a pressure reducing member connected to the airtight chamber, wherein the pressure reducing member is capable of changing a pressure reducing rate in the course of pressure reduction.

The mold-press forming apparatus preferably further comprises:

a forming chamber which contains at least one of a plurality of processing chambers comprising a heating chamber, a pressing chamber, and a cooling chamber, a transferring member for successively transferring the mold in the processing chambers, and a loading unit for loading the mold into the forming chamber, the loading unit comprises the airtight chamber.

With the above-mentioned structure, even if evacuation is performed to reduce a pressure in the airtight chamber (loading/unloading chamber), the forming material is prevented from being displaced in the mold by changing the pressure reducing rate. It is thus possible to prevent occurrence of uneven thickness of the formed product.

In the above-mentioned apparatus, the pressure reducing member comprises a pump for evacuating a gas from the airtight chamber, an evacuation path for connecting the airtight chamber and the pump, a plurality of valves arranged in the evacuation path in parallel to each other, and a controller for controllably open and close the valves.

With the above-mentioned structure, by controllably opening and closing the valves, it is possible to change the pressure reducing rate stepwise by slowly evacuating the gas at first and then rapidly evacuating the gas.

The pressure reducing rate may be changed by adjusting an opening degree of a single valve to thereby control an evacuation volume.

According to this invention, there is also provided a formed product manufacturing method comprising:

supplying a forming material in a mold which comprises an upper mold, a lower mold, and a sleeve, press-forming the forming material into a formed product as the forming material in a softened state is contained in the mold, which method further comprising:

prior to the press forming, reducing a pressure of an airtight chamber as containing the mold, a pressure reducing rate being changed during the course of the pressure reducing, and introducing the mold from the airtight chamber into a forming chamber, the forming chamber having a predetermined atmosphere therein.

In the formed product manufacturing method, the forming chamber preferably comprises at least one of processing chambers including a heating chamber, a pressing chamber, and a cooling chamber.

When the pressure is reduced stepwise as mentioned above, even if evacuation is carried out in order to reduce the pressure in the airtight chamber, the forming material is prevented from being displaced in the mold so as to prevent occurrence of uneven thickness of the formed product.

In the method according to this invention, the pressure reducing rate is increased in the course of the pressure reducing step. Specifically, the pressure reducing step comprises an initial pressure reduction step of carrying out initial pressure reduction and a secondary pressure reduction step of carrying out secondary pressure reduction by increasing the initial pressure reducing rate after the initial pressure reduction step, the secondary pressure reduction step being carried out when the pressure in the airtight chamber is lowered to 2000 Pa or less.

According to this invention, evacuation is carried out in the initial pressure reduction so that the forming material in the mold is not displaced. After the pressure in the airtight chamber is lowered to 2000 Pa or less without the possibility of displacement of the forming material, the pressure reducing rate is increased and the pressure is efficiently reduced.

In the method of this invention, the mold comprises a cylindrical body mold as the sleeve, the upper mold and the lower mold being fitted to an upper part and a lower part of the cylindrical body mold, respectively, the cylindrical body mold having at least one ventilation hole communicating with a forming space defined by the upper and the lower molds.

According to this invention, even in the mold with the ventilation hole formed in the body mold so as to easily evacuate the inside of the mold during press forming, evacuation is rapidly carried out without causing the displacement.

In the method of this invention, the mold is supported on a support placed in the airtight chamber.

According to this invention, even in case where the mold is merely placed on the support in order to easily place and take out the mold onto and from the support, the forming material in the mold is prevented from being displaced due to fall, vibration, or inclination of the mold during pressure reduction.

In the method of this invention, a gas in the forming chamber is introduced into the airtight chamber after the secondary pressure reduction is carried out.

According to this invention, the gas in the forming chamber is supplied at a desired rate into the loading chamber which has been evacuated. Thus, gas exchange is smoothly carried out. Further, an additional source for supplying a nonoxidizing gas is not required.

As described above, according to this invention, it is possible to prevent the forming material from being displaced in the mold during pressure reduction of the airtight chamber (mold loading chamber). Therefore, the formed product is prevented from occurrence of uneven thickness. Further, gas exchange at the airtight chamber is efficiently carried out without extending a forming cycle time.

DESCRIPTION OF THE PREFERRED EMBODIMENTS

First Embodiment

Figure 1:
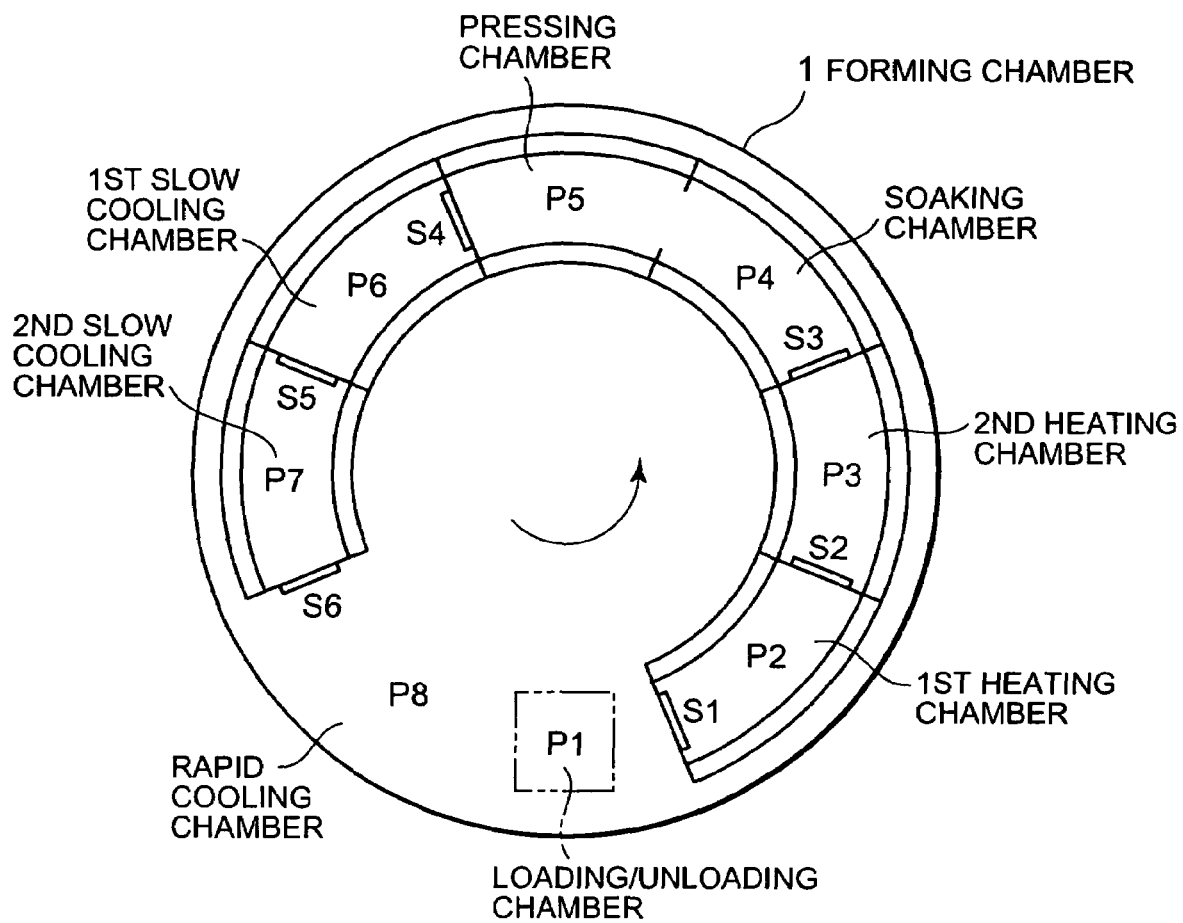
FIG. 1 is a schematic plan view which is used in describing mold-press forming apparatuses according to this invention and according to a prior art.
Figure 2:
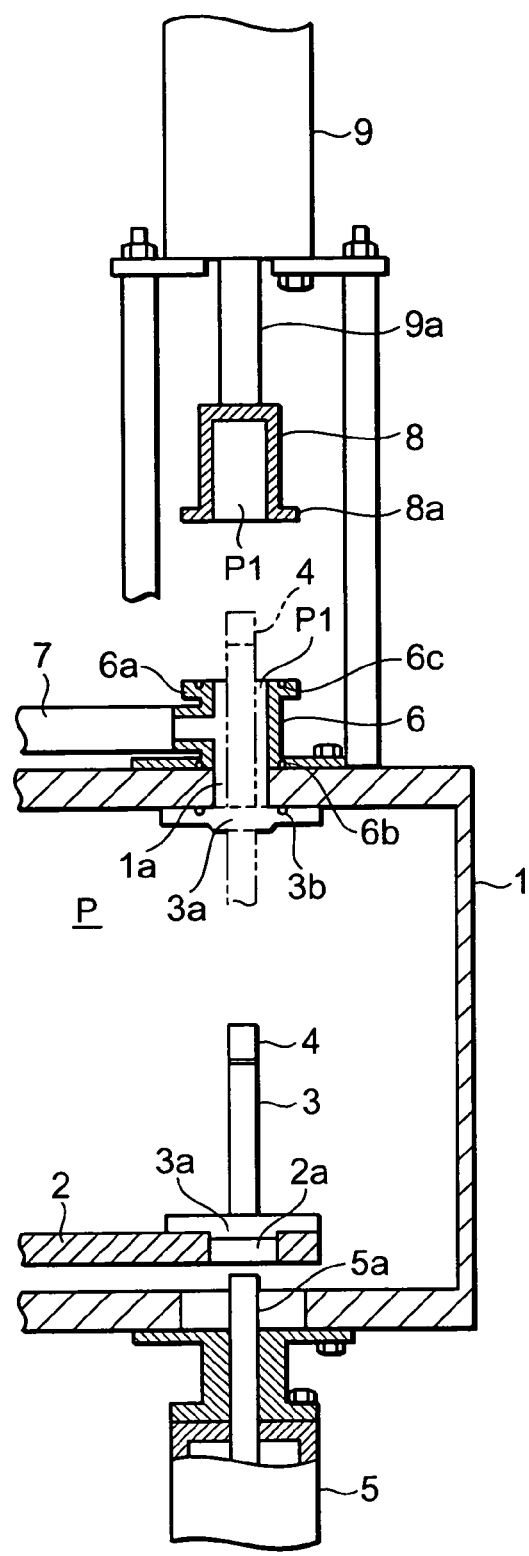
FIG. 2 is a vertical sectional view of a loading/unloading chamber in FIG. 1.

Now, description will be made of a first embodiment of this invention with reference to the drawing.

A mold-press forming apparatus according to the first embodiment is similar in structure of a forming chamber and processing chambers in the forming chamber to the conventional apparatus disclosed in the above-mentioned publication and illustrated in FIG. 1.

Specifically, the apparatus comprises a forming chamber 1, a loading/unloading chamber P1 disposed above the forming chamber 1, a plurality of processing chambers (a first heating chamber P2, a second heating chamber P3, a soaking chamber P4, a pressing chamber P5, a first slow cooling chamber P6, a second slow cooling chamber P7, and a rapid cooling chamber P8) which are arranged inside the forming chamber 1 sequentially in a circumferential direction. The inside of the forming chamber 1, i.e., the processing chambers (processing portions) P2 through P8 are continuously under a nonoxidizing gas atmosphere. A mold 4 containing a forming material (glass to be formed) is placed on a support 3 of a rotary table 2 and is successively transferred through the processing chambers P2 to P8. The processing chambers P2 to P8 are partitioned from one another by a plurality of shutters S1 to S6 as shown in the figure (no shutter is formed between the soaking chamber P4 and the pressing chamber P5).

Figure 3A:
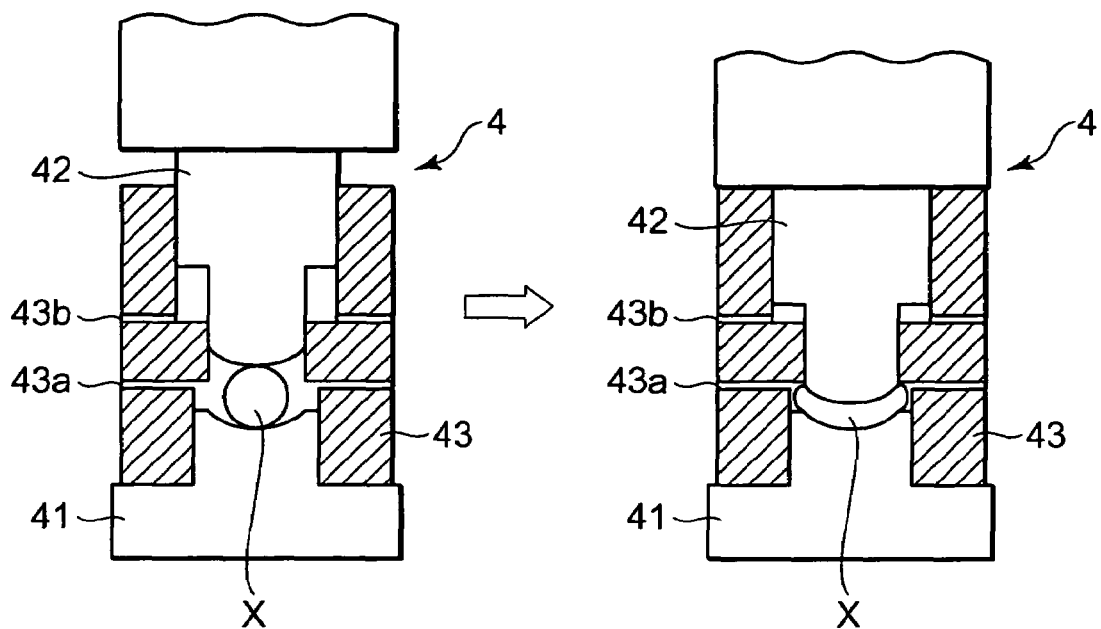
FIGS. 3A and 3B are sectional views of a mold for describing a positional relationship between the mold and a forming material and a state of a formed product.
Figure 3B:
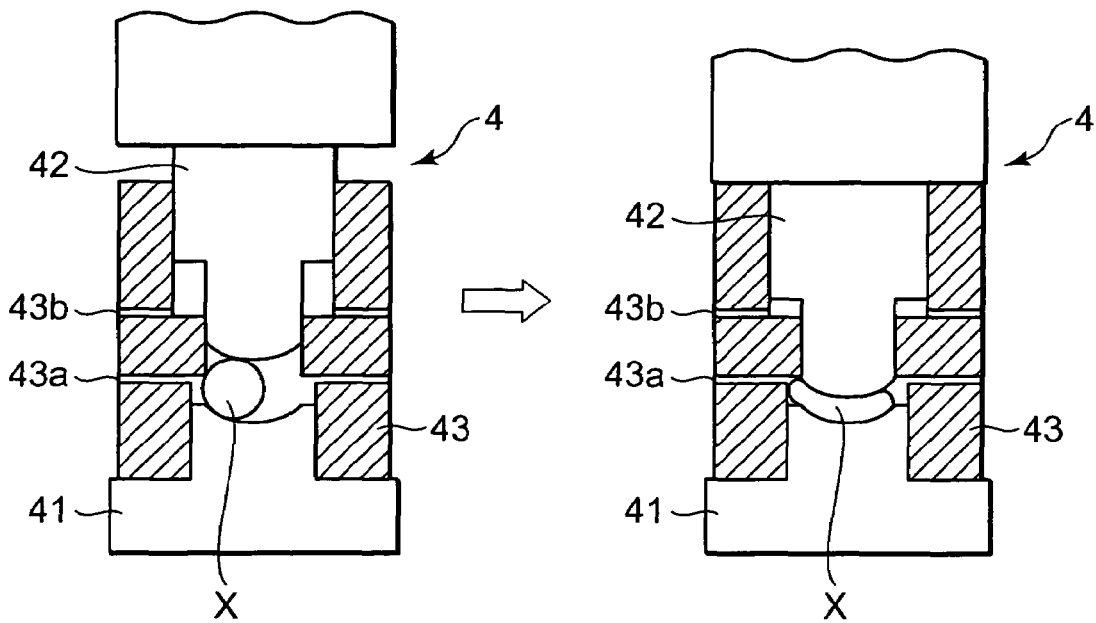

As shown in FIGS. 3A and 3B, the mold 4 comprises a lower mold 41, an upper mold 42, and a cylindrical body mold 43 used as a sleeve. The body mold 43 is provided with ventilation holes 43a and 43b. One or a plurality of (preferably, two to six) ventilation holes 43a penetrate through the body mold 43 at a substantially same height at different positions in a circumferential direction to connect a forming space defined between the upper and the lower molds 42 and 41 and the outside of the body mold 43. A plurality of ventilation holes 43b penetrate through the body mold 43 at a substantially same height at different positions in the circumferential direction to connect a moving space of the upper mold 42 and the outside of the body mold 43.

These ventilation holes mainly serve to release a gas in the inside of the mold 4 to the outside during press forming and also contribute to gas exchange in the mold 4 during gas exchange of the loading/unloading chamber P1. In this embodiment, the mold 4 containing the forming material is placed on the support 3 in the loading/unloading (airtight) chamber P1 and then gas exchange (air is evacuated and a nonoxidizing gas is filled) of the loading/unloading chamber P1 is performed.

Figure 4:
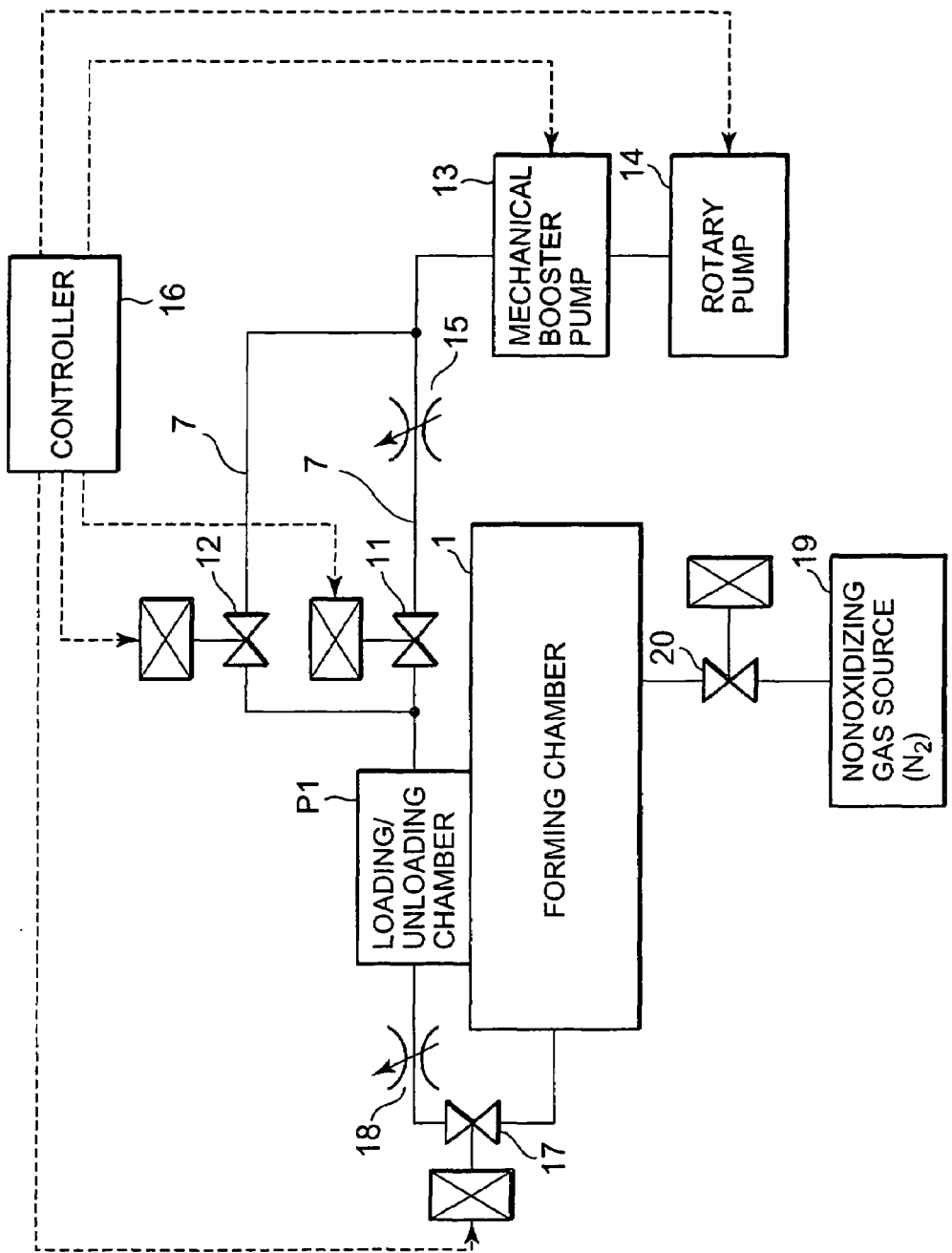
FIG. 4 is a schematic block diagram of a mold-press forming apparatus according to a first embodiment of this invention.

As shown in FIG. 4, in the mold-press forming apparatus in this embodiment, the loading/unloading chamber P1 is connected to evacuation paths 7 as parallel paths. The evacuation paths 7 are provided with valves 11 and 12. The evacuation paths 7 are connected to an evacuating member having a sufficient evacuation ability, for example, a rotary pump 14 and/or a mechanical booster pump 13. If necessary, an evacuation route may be throttled by a variable throttle member 15 to limit the evacuation ability within an appropriate range.

In this embodiment, a pressure reducing member is formed by a combination of at least the evacuation paths 7 connected to the loading/unloading chamber P1, the valves 11 and 12 provided in the evacuation paths 7, the evacuating member comprising the rotary pump 14 and/or the mechanical booster pump 13, and a controller (which will later be described).

For example, the rotary pump (oil-sealed rotary vacuum pump) 14 having an ability of 10000 cm$^3$/sec is used to 2000 Pa. For pressure reduction below 2000 Pa, the mechanical booster pump 13 having an ability of 77000 cm$^3$/sec is additionally used while the rotary pump 14 is kept operated. The mechanical booster pump 13 used herein is an auxiliary evacuation pump capable of increasing the pressure reducing rate when it is used in combination with a dry pump, a rotary pump, or a water ring pump.

Evacuation for gas exchange is required when the mold 4 is loaded into the forming chamber 1. Therefore, if loading and unloading of the mold 4 are carried out in separate chambers, i.e. a loading chamber and an unloading chamber, pressure reduction (evacuation) is carried out at least in the loading chamber.

In the mold-press forming apparatus in this embodiment, as illustrated in FIG. 4, a gas path provided with a valve 17 and a variable throttle 18 is connected between the forming chamber 1 having the processing chambers and the loading/unloading chamber P1.

A controller 16 controls operations of the valves 11 and 12 provided in the evacuation paths 7, the rotary pump 14 and/or the mechanical booster pump 13 as the evacuating member, the variable throttle 15 for adjusting an opening degree of the evacuation route, and the valve 17.

The forming chamber 1 is supplied with a nonoxidizing gas such as a nitrogen gas from a nonoxidizing gas source 19 through a valve 20.

Next, description will be made of a pressure reducing operation carried out by the use of the above-mentioned apparatus. At first, description will be made of a cause of displacement of the forming material in the mold 4.

During rough pumping in a range near an atmospheric pressure, rapid pressure reduction causes an airstream in the loading/unloading chamber P1. This results in unbalanced evacuation from the ventilation holes 43a and 43b penetrating the body mold 43, thereby moving the forming material in the mold 4. The rapid pressure reduction causes the mold 4 to vibrate or incline on the support 3 so that the forming material in the mold 4 is displaced.

The forming material is lightly clamped between the lower mold 41 and the upper mold 42. Therefore, once the forming material is displaced, the forming material hardly returns to its initial position. Thus, once the displacement occurs, in the press forming step carried out later, forming is performed in a state where the forming material is left displaced. As a result, the formed product having uneven thickness is formed.

Figure 5:
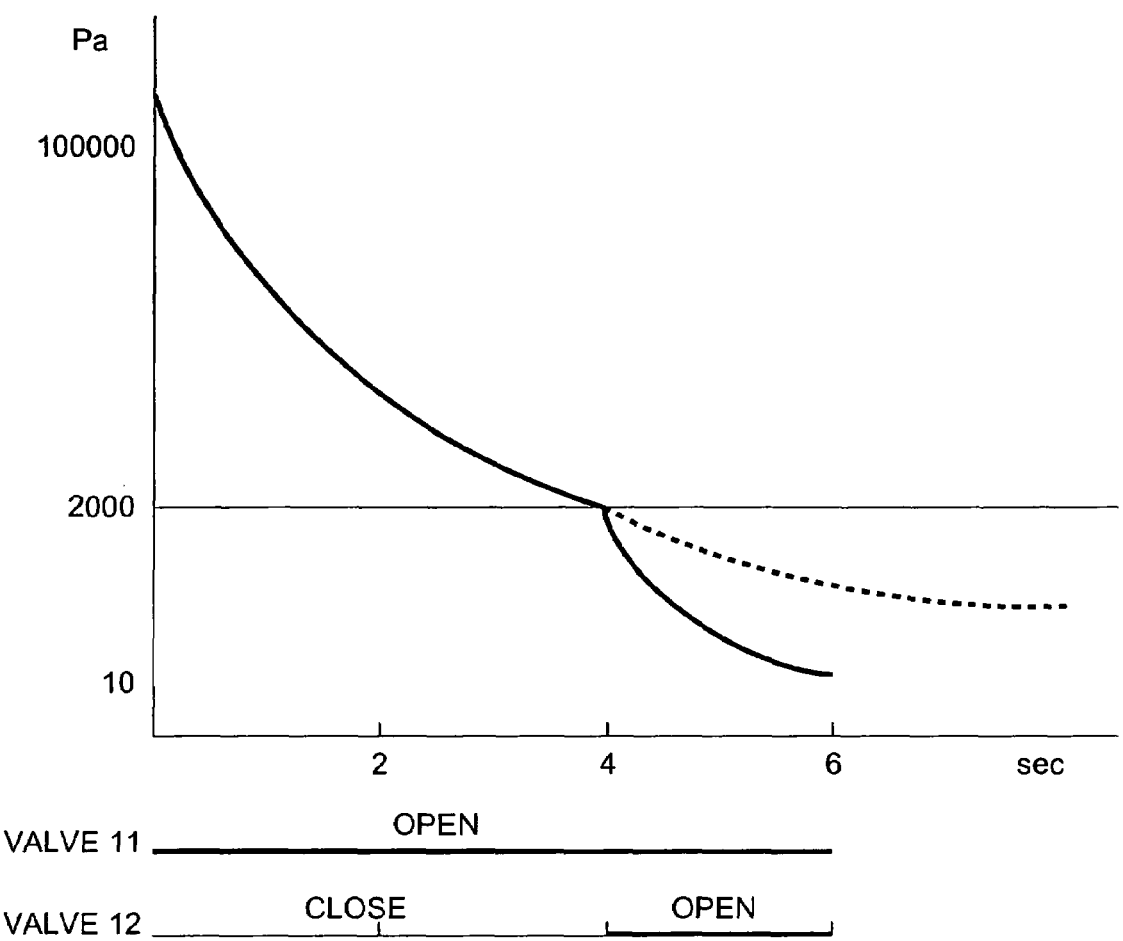
FIG. 5 is a graph showing the relationship between a pressure in the loading/unloading chamber and time when gas exchange is performed in the mold-press forming apparatus according to the first embodiment of this invention.

In view of the above, in this embodiment, initial evacuation (that is, initial pressure reduction) and secondary evacuation (that is, secondary pressure reduction) following the initial evacuation are carried out on evacuation, as shown in FIG. 5. As seen from FIG. 5, when the pressure reducing rate (pressure difference per unit time when the loading/unloading chamber P1 at the atmospheric pressure is reduced in pressure) is smaller as a pressure in the loading/unloading chamber P1 is lowered. Taking the volume and the shape of the loading/unloading chamber P1 and the position of the mold 4 into consideration, the pressure reducing rate in the initial evacuation is selected within a range such that no airstream is caused in the loading/unloading chamber P1 in an initial state of evacuation (when the pressure reducing rate is greatest), i.e., within a range such that the mold 4 is not inclined or the forming material in the mold 4 is not moved. Thus, displacement of the forming material contained in the mold 4 is suppressed.

When the evacuation is started and the pressure in the loading/unloading chamber P1 is lowered, the evacuation rate is decreased. Therefore, it takes a considerably long time to carry out sufficient evacuation (for example, to lower the pressure in the loading/unloading chamber P1 to 100 Pa or less, preferably 10 Pa or less), as depicted by a broken line curve in FIG. 5, in case where an initial evacuation ability is maintained. Such a long evacuation time affects a cycle time of the forming process as a whole and is unfavorable. Therefore, it is unfavorable to reduce the pressure to a desired pressure by the initial evacuation ability selected within a range such that the displacement of the forming material is suppressed.

In this embodiment, when the inside of the loading/unloading chamber P1 is reduced in pressure to 2000 Pa or less, the pressure reducing rate is increased (that is, the secondary evacuation (or the secondary pressure reduction) is carried out) as readily understood from FIG. 5. For example, the pressure reducing rate may be increased by enhancing the operation of the evacuating members 14 and 13 during the secondary evacuation or by additionally using an auxiliary evacuating member during the secondary evacuation. Or, at least, use of such the additional evacuation is useful in effectively resisting against lowering of the pressure reducing rate. In other words, by means of the pressure reducing member capable of changing the pressure reducing rate, the pressure reduction rate, which could be lowered, is effectively recovered in the course of the pressure reduction, which contributes to the production efficiency of the press forming. In this embodiment, the initial evacuation is carried out by the use of the rotary pump 14 while the secondary evacuation is carried out by the use of the mechanical booster pump 13 in addition to the rotary pump 14. In this embodiment, during the initial evacuation, the ability of the rotary pump 14 is limited by the throttle 15 to thereby select an appropriate range.

Each of the valves 11 and 12 is controllably opened and closed in response to a signal from the controller 16. Specifically, the valve 11 is opened and the valve 12 is closed until the pressure in the loading/unloading chamber P1 is lowered to 2000 Pa by the initial evacuation. Below 2000 Pa, the valve 12 is opened also.

When the loading/unloading chamber P1 is evacuated and the pressure is lowered to 2000 Pa or less, preferably to 1000 Pa or less, the forming material is not displaced even if the pressure reducing rate (evacuation) is increased.

The pressure in the loading/unloading chamber P1 is measured by a sensor (not shown). When it is detected that the pressure in the loading/unloading chamber P1 is lowered to 2000 Pa by the initial evacuation, the valve 12 is opened in response to a signal from the controller 16 and the mechanical booster pump 13 is operated in response to a signal from the controller 16. Thus, the secondary evacuation is started.

At the time instant when the secondary evacuation is started, the pressure reducing rate is deviated from an extension line of a pressure reducing rate curve by the initial evacuation and is increased. In other words, the pressure reducing rate curve has an inflection point. In this case also, as the pressure in the loading/unloading chamber P1 is lowered, the pressure reducing rate is gradually decreased. Therefore, it is preferable to use an evacuating member having a sufficient evacuation ability so that a required forming time is not excessively long.

Thus, in this embodiment, the evacuation ability of the evacuating member is selected in an initial stage of evacuation so that the pressure reducing rate falls within a predetermined range. In this manner, the above-mentioned disadvantage is eliminated. Further, in order to shorten the production cycle time, the pressure reducing rate is increased at a particular time point after pressure reduction to the predetermined range (2000 Pa or less) is achieved. Accordingly, uneven thickness is avoided without decreasing the mass-production efficiency. Thus, this embodiment is very effective.

In this embodiment, two-stage evacuation is carried out. Alternatively, taking the pressure to be reached and the required forming time into consideration, a multi-stage evacuation more than two stages may be carried out. For example, the multi-stage evacuation may be realized by providing a plurality of the evacuation paths 7 corresponding to the number of stages and arranging valves at the respective evacuation paths.

In this embodiment, the airtight chamber is the loading/unloading chamber for loading and unloading the mold. It will readily be understood that, in case where the loading chamber and the unloading chamber are separately formed, this invention may be applied to the loading chamber and the unloading chamber.

In this embodiment, the processing chambers include the first heating chamber, the second heating chamber, the soaking chamber, the pressing chamber, the first slow cooling chamber, the second slow cooling chamber, and the rapid cooling chamber. However, the number of the processing chambers is not limited to the above. Depending upon the glass material and the shape of the formed product, the number of the processing chambers is appropriately selected.

Second Embodiment

This invention may be implemented into not only the above-mentioned embodiment but also various types of mold-press forming apparatus.

Figure 6:
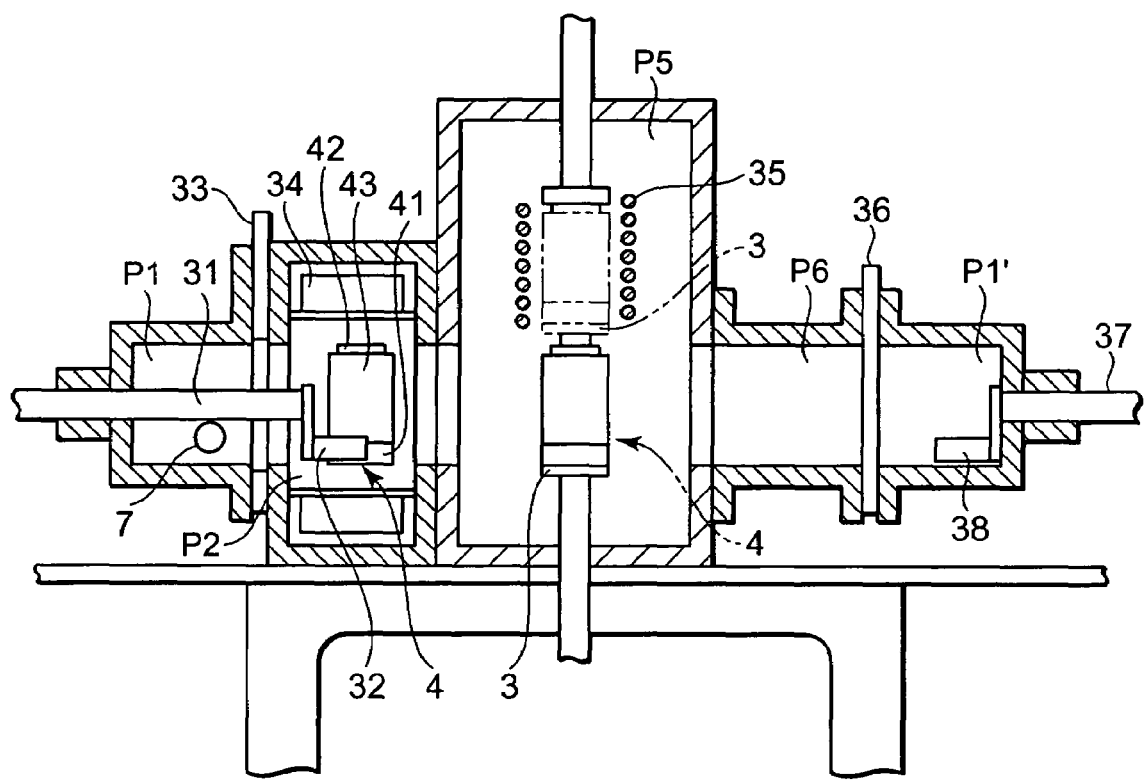
FIG. 6 is a sectional view of a mold-press forming apparatus according to a second embodiment of this invention.

Referring to FIG. 6, a mold-press forming apparatus according to a second embodiment of this invention comprises an apparatus body mounted on a mount table and including a heating chamber P2, a pressing chamber P5, and a slow cooling chamber P6 which form a forming chamber 1. At an inlet side of the heating chamber P2, a loading chamber P1 for loading a mold 4 is arranged. At an outlet side of the slow cooling chamber P6, an unloading chamber P1' for unloading the mold 4 is arranged.

Between the loading chamber P1 and the pressing chamber P5, an arm 31 of a robot (not shown) is reciprocally moved. Between the unloading chamber P1' and the pressing chamber P5, an arm 37 of a robot (not shown) is reciprocally moved. The arms 31 and 37 have holding portions 32 and 38 formed at their ends to hold a lower part (parts of the lower mold 41 and the body mold 43) of the mold 4, respectively.

Although not shown in detail, the mold 4 used in the second embodiment comprises the lower mold 41, an upper mold 42, and the cylindrical body mold 43 provided with ventilation holes 43a and 43b, like the mold 4 in the first embodiment.

Between the loading chamber P1 and the heating chamber P2, a partitioning plate 33 is arranged to be openable and closable. Between the unloading chamber P1' and the slow cooling chamber P6, a partitioning plate 36 is arranged to be openable and closable. When the partitioning plate 33 is closed, the loading chamber P1 is put into an airtight state and is reduced in pressure by evacuation through evacuation paths 7. After pressure reduction (evacuation), the partitioning plate 33 is gradually opened to supply a gas in the heating chamber P2 to the loading chamber P1. Thus, gas exchange is carried out.

Although not shown in the figure, the evacuation paths 7 are parallel paths provided with valves 11 and 12, respectively, like in the first embodiment. The parallel evacuation paths 7 are connected to an evacuating member having a sufficient evacuation ability, for example, a rotary pump 14 and/or a mechanical booster pump 13, like in the first embodiment.

The heating chamber P2 is provided with preheating heaters 34 disposed at upper and lower parts thereof. The pressing chamber P5 is provided with a heater 35 disposed inside. The pressing chamber P5 is provided inside with a support 3 for receiving the mold 4 placed thereon and for vertically moving to the heater 35, and a press shaft 9b concentrically faced to the support 3 and vertically movable. The press shaft 9b applies a pressure to the upper mold 42 of the mold 4 placed on the support 3 to thereby execute press forming.

In the forming apparatus having the above-mentioned structure also, rapid evacuation (pressure reduction) from the loading chamber P1 will cause an airstream in the loading chamber P1 so that the mold 4 held by the holding portion 32 is vibrated or inclined. In addition, evacuation from the ventilation holes 43a penetrating the body mold 43 is unbalanced so that the forming material in the mold 4 is undesirably moved.

In the forming apparatus according to the second embodiment also, pressure reduction is preferably carried out stepwise, like in the first embodiment.

EXAMPLE

By the use of the mold-press forming apparatus according to the first embodiment of this invention, a concave meniscus lens was formed by the use of an optical glass preliminarily formed into a spherical shape (glass preform) as the forming material.

The glass preform preliminarily formed into a spherical shape was supplied by the use of a robot (not shown) to the mold in a disassembled state. Thereafter, the mold was assembled. The mold was placed in the loading/unloading chamber P1 and gas exchange was performed.

Evacuation was carried out in the following manner. When the loading/unloading chamber P1 is kept at an atmospheric pressure, the valve 11 was opened (the valve 12 was closed) and the initial evacuation was performed by the rotary pump 14 having an evacuation ability of 10000 $cm^3$/sec. The evacuation path 7 provided with the valve 11 was preliminarily throttled by the variable throttle 15 so that the evacuation ability was decreased. As a result, the average evacuation rate was 150 $cm^3$/sec and the atmosphere in the loading/unloading chamber P1 having a volume of 900 $cm^3$ was evacuated in six seconds.

As the evacuation process, after lapse of about 4 seconds from the start of the initial evacuation, the pressure in the loading/unloading chamber P1 was reduced to about 2000 Pa. At this time instant, the mechanical booster pump 13 having an ability of 77000 $cm^3$/sec was operated in addition to the rotary pump 14 and the valve 12 was opened to start the secondary evacuation. By performing the secondary evacuation for about two seconds, the pressure in the loading/unloading chamber P1 was reduced to about 10 Pa.

In the above-mentioned manner, evacuation was completed in about six seconds in total. Thereafter, the valves 11 and 12 were closed and the valve 17 was opened to introduce the atmospheric gas in the forming chamber 1 into the loading/unloading chamber P1. At this time, if the gas introduction rate is excessively large, the displacement of the forming material may be caused to occur. Therefore, by appropriately throttling the valve 18, the forming material is held at the center in the mold 4. However, since gas introduction from the forming chamber 1 requires a very short time (a pressure increasing rate by the introduction is not decreased like the pressure reducing rate during evacuation), stepwise operation is unnecessary.

Then, after gas exchange of the loading/unloading chamber P1, a piston rod 5a of the cylinder 5 is lowered so that the support 3 with the mold 4 placed thereon was lowered and placed on the rotary table 2. Thereafter, the support 3 with the mold 4 placed thereon was successively transferred through the first and the second heating chambers P2 and P3, the soaking chamber P4, the pressing chamber P5, the first and the second slow cooling chambers P6 and P7, and the rapid cooling chamber P8 to be processed. Thus, glass mold press lenses were continuously formed. By the use of 10 molds, 1000 lenses were formed in total. In this case, no shape defect due to uneven thickness was caused.

This invention is applicable to a mold-press forming apparatus for producing an optical element (for example, a high-precision glass lens) improved in profile accuracy and surface accuracy by preventing uneven thickness during forming. This invention is also applicable to manufacture of a formed product (for example, an optical element) by the use of the mold-press forming apparatus.

What is claimed is:

1. A formed product manufacturing method comprising:
supplying a forming material in a mold which comprises an upper mold, a lower mold, and a sleeve, said mold comprises a cylindrical body mold as said sleeve, said upper mold and said lower mold being fitted to an upper part and a lower part of said cylindrical body mold, respectively, said cylindrical body mold having a plurality of ventilation holes in a circumferential direction, each of said plurality of ventilation holes connecting a forming space defined by said upper and said lower molds and by said cylindrical body mold to an outside of said cylindrical body mold,
press-forming said forming material into a formed product as said forming material in a softened state is contained in said mold, which method further comprising:
a pressure reducing step of, prior to said press forming, reducing a pressure of an airtight chamber as containing into which said mold containing said forming material is introduced, a pressure reducing rate being changed during the course of said pressure reducing step, and
introducing said mold containing said forming material from said airtight chamber into a forming chamber which comprises at least one of processing chambers including a heating chamber, a pressing chamber, and a cooling chamber and which is different from said airtight chamber, said forming chamber having a predetermined atmosphere therein,
wherein said pressure reducing rate is increased in the course of said pressure reducing step, and
wherein said plurality of ventilation holes of said cylindrical body mold contribute to evacuation carried out in said airtight chamber without causing displacement of said forming material in said mold during said pressure reducing step.

2. The formed product manufacturing method as claimed in claim 1, wherein said pressure reducing step comprises an initial pressure reduction step of carrying out initial pressure reduction and a secondary pressure reduction step of carrying out secondary pressure reduction by increasing the initial pressure reducing rate after said initial pressure reduction step, said secondary pressure reduction step being carried out when the pressure in said airtight chamber is lowered to 2000 Pa or less.

3. The formed product manufacturing method as claimed in claim 1, wherein said mold is supported on a support placed in said airtight chamber.

4. The formed product manufacturing method as claimed in claim 2, wherein a gas in said forming chamber is introduced into said airtight chamber after said secondary pressure reduction is carried out.

* * * * *